US012566187B2

(12) United States Patent
Singh et al.

(10) Patent No.: US 12,566,187 B2
(45) Date of Patent: Mar. 3, 2026

(54) SYSTEMS AND METHODS FOR DETERMINING TEST RESULT ACCURACIES IN DIAGNOSTIC LABORATORY SYSTEMS

(71) Applicant: Siemens Healthcare Diagnostics Inc., Tarrytown, NY (US)

(72) Inventors: Vivek Singh, Princeton, NJ (US); Rayal Prasad, Princeton, NJ (US); Yao-Jen Chang, Princeton, NJ (US); Venkatesh NarasimhaMurthy, Hillsborough, NJ (US); Mark Edwards, Armonk, NY (US); Benjamin S. Pollack, Jersey City, NJ (US); Ankur Kapoor, Plainsboro, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 19/108,195

(22) PCT Filed: Sep. 7, 2023

(86) PCT No.: PCT/US2023/073611
§ 371 (c)(1),
(2) Date: Mar. 3, 2025

(87) PCT Pub. No.: WO2024/054890
PCT Pub. Date: Mar. 14, 2024

(65) Prior Publication Data
US 2025/0258188 A1      Aug. 14, 2025

Related U.S. Application Data

(60) Provisional application No. 63/374,885, filed on Sep. 7, 2022.

(51) Int. Cl.
| | | |
|---|---|---|
| *G01N 35/00* | (2006.01) | |
| *G06N 3/042* | (2023.01) | |
| *G06N 3/08* | (2023.01) | |

(52) U.S. Cl.
CPC ....... *G01N 35/00613* (2013.01); *G06N 3/042* (2023.01); *G06N 3/08* (2013.01)

(58) Field of Classification Search
CPC .... G01N 35/00613; G06N 3/042; G06N 3/08; G16H 50/20; G16H 50/70; G16H 10/60;
(Continued)

(56) References Cited

U.S. PATENT DOCUMENTS

| | | | |
|---|---|---|---|
| 5,130,936 A | 7/1992 | Sheppard et al. | |
| 11,264,140 B1 * | 3/2022 | Tal | G16H 50/20 |

(Continued)

FOREIGN PATENT DOCUMENTS

| | | |
|---|---|---|
| CN | 101071412 A | 11/2007 |
| CN | 109640830 A | 4/2019 |

(Continued)

OTHER PUBLICATIONS

International Search Report and Written Opinion of International Application No. PCT/US2023/073611 dated Jan. 5, 2024.
(Continued)

*Primary Examiner* — Mohammad K Islam

(57) ABSTRACT

A method of determining the accuracy of a test performed by a diagnostic laboratory system includes obtaining one or more first measurements during a first operation of the test performed by the diagnostic laboratory system. One or more second measurements are obtained during a second operation of the test performed by the diagnostic laboratory system. The first measurements and the second measurements are collectively analyzed using a trained model that calculates an uncertainty score for the test based on learned
(Continued)

correlations between the first operation and the second operation. The uncertainty score may be used to determine whether the test results can be relied upon or whether the test should be rerun. Other methods and systems are disclosed.

20 Claims, 9 Drawing Sheets

(58) Field of Classification Search
CPC ........ G16H 50/30; G16H 15/00; G16H 30/40; G16H 10/20; G16H 20/10; G16H 10/40; G16H 20/40; G16H 20/70; G16H 40/20; G16H 40/63; G16H 40/67; G16H 50/50; G16H 50/80; G16H 70/20; G16H 70/40; G16H 70/60; A61B 5/7264; A61B 5/0002; A61B 5/0071; A61B 5/0073; A61B 5/316; A61B 5/349; A61B 5/4094; A61B 5/7203
See application file for complete search history.

(56) References Cited

U.S. PATENT DOCUMENTS

| | | | | |
|---|---|---|---|---|
| 2008/0052119 | A1* | 2/2008 | Iliff | G16H 50/20 |
| | | | | 705/2 |
| 2010/0299126 | A1* | 11/2010 | Chugunov | G01V 11/00 |
| | | | | 703/10 |
| 2017/0112401 | A1* | 4/2017 | Rapin | A61B 5/316 |
| 2018/0315505 | A1* | 11/2018 | Itu | G16H 10/20 |
| 2019/0025280 | A1 | 1/2019 | Kaditz et al. | |
| 2019/0354689 | A1 | 11/2019 | Li et al. | |
| 2020/0334416 | A1* | 10/2020 | Vianu | G06V 10/764 |
| 2020/0334566 | A1* | 10/2020 | Vianu | G06N 3/084 |
| 2020/0362027 | A1* | 11/2020 | Newbold | A61K 39/3955 |
| 2020/0411176 | A1 | 12/2020 | Hadorn et al. | |
| 2021/0110262 | A1 | 4/2021 | Schmitt et al. | |
| 2021/0125691 | A1* | 4/2021 | Wlodarczyk-Pruszynski | |
| | | | | G16C 20/10 |
| 2021/0192730 | A1* | 6/2021 | Raciti | G06T 7/0012 |
| 2021/0193301 | A1* | 6/2021 | Kanan | G16H 50/80 |
| 2021/0396774 | A1 | 12/2021 | Mizutani et al. | |
| 2022/0261668 | A1* | 8/2022 | Stumpe | G06F 16/284 |
| 2022/0300280 | A1* | 9/2022 | Rafey | G06F 11/3409 |
| 2022/0351053 | A1* | 11/2022 | Norvaisas | G06N 7/01 |
| 2023/0125073 | A1* | 4/2023 | Raghunathan | G06N 3/09 |
| | | | | 706/25 |
| 2023/0206431 | A1* | 6/2023 | Tirupathi | A61B 5/0071 |
| | | | | 382/128 |
| 2025/0095857 | A1* | 3/2025 | Nemati | G06N 3/0985 |
| 2025/0153334 | A1* | 5/2025 | Abbott | G01M 7/025 |

FOREIGN PATENT DOCUMENTS

| | | |
|---|---|---|
| CN | 112435753 A | 3/2021 |
| CN | 112840212 A | 5/2021 |
| CN | 114781423 A | 7/2022 |
| EP | 3971910 A1 | 3/2022 |
| JP | 2021507325 A | 2/2021 |
| WO | 2022073244 A1 | 4/2022 |

OTHER PUBLICATIONS

Van Amersfoort, J., Smith, L., Jesson, A., Key, O., & Gal, Y. (Mar. 7, 2021). On feature collapse and deep kernel learning for single forward pass uncertainty. arXiv preprint arXiv:2102.11409.

Randell Edward et al.; "Delta checkes in the clinical laboratory"; Reviews in Clinic in Clinical Laboratory Sciences., [Online] vol. 56, No. 2, 2019 (Feb. 17, 2019), pp. 75-97) XP093179438, US ISSN: 1040-8363, DOI: 10.1080/10408363.2018.1540536; Retrieved from the Internet: URL:URL:https://dx.doi.org/10.1080/10408363.2018.1540536>.

* cited by examiner

202

| Sample Handler 210 | Transport System 212 | Reagent Storage 214 |
|---|---|---|
| Aspiration and Dispense Module 216 | Photometric Analyzer 218 | Quality Check Program 220 |

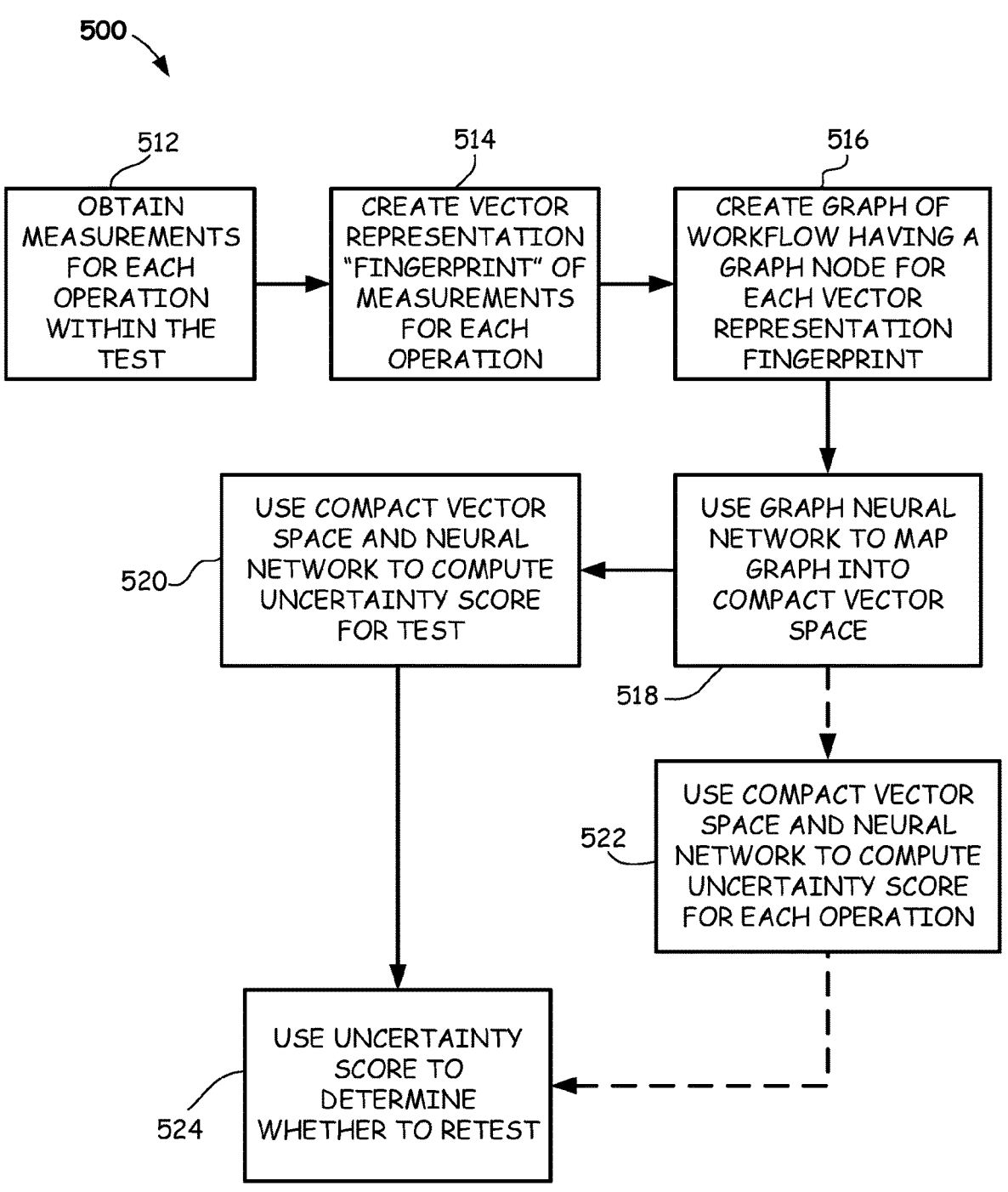

500

512
OBTAIN MEASUREMENTS FOR EACH OPERATION WITHIN THE TEST

514
CREATE VECTOR REPRESENTATION "FINGERPRINT" OF MEASUREMENTS FOR EACH OPERATION

516
CREATE GRAPH OF WORKFLOW HAVING A GRAPH NODE FOR EACH VECTOR REPRESENTATION FINGERPRINT

520
USE COMPACT VECTOR SPACE AND NEURAL NETWORK TO COMPUTE UNCERTAINTY SCORE FOR TEST

518
USE GRAPH NEURAL NETWORK TO MAP GRAPH INTO COMPACT VECTOR SPACE

522
USE COMPACT VECTOR SPACE AND NEURAL NETWORK TO COMPUTE UNCERTAINTY SCORE FOR EACH OPERATION

524
USE UNCERTAINTY SCORE TO DETERMINE WHETHER TO RETEST

FIG. 5A

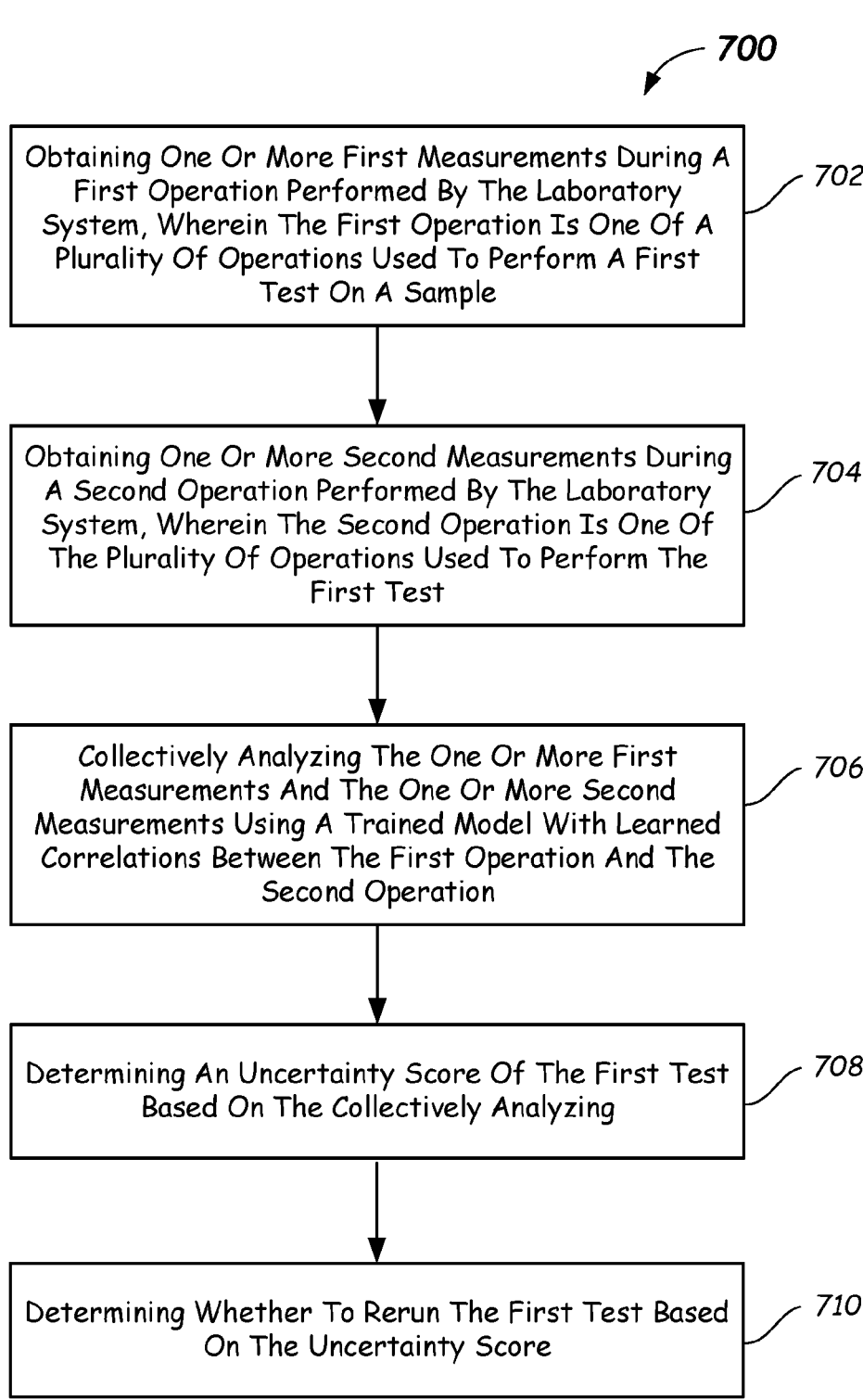

*700*

Obtaining One Or More First Measurements During A First Operation Performed By The Laboratory System, Wherein The First Operation Is One Of A Plurality Of Operations Used To Perform A First Test On A Sample — *702*

Obtaining One Or More Second Measurements During A Second Operation Performed By The Laboratory System, Wherein The Second Operation Is One Of The Plurality Of Operations Used To Perform The First Test — *704*

Collectively Analyzing The One Or More First Measurements And The One Or More Second Measurements Using A Trained Model With Learned Correlations Between The First Operation And The Second Operation — *706*

Determining An Uncertainty Score Of The First Test Based On The Collectively Analyzing — *708*

Determining Whether To Rerun The First Test Based On The Uncertainty Score — *710*

FIG. 7

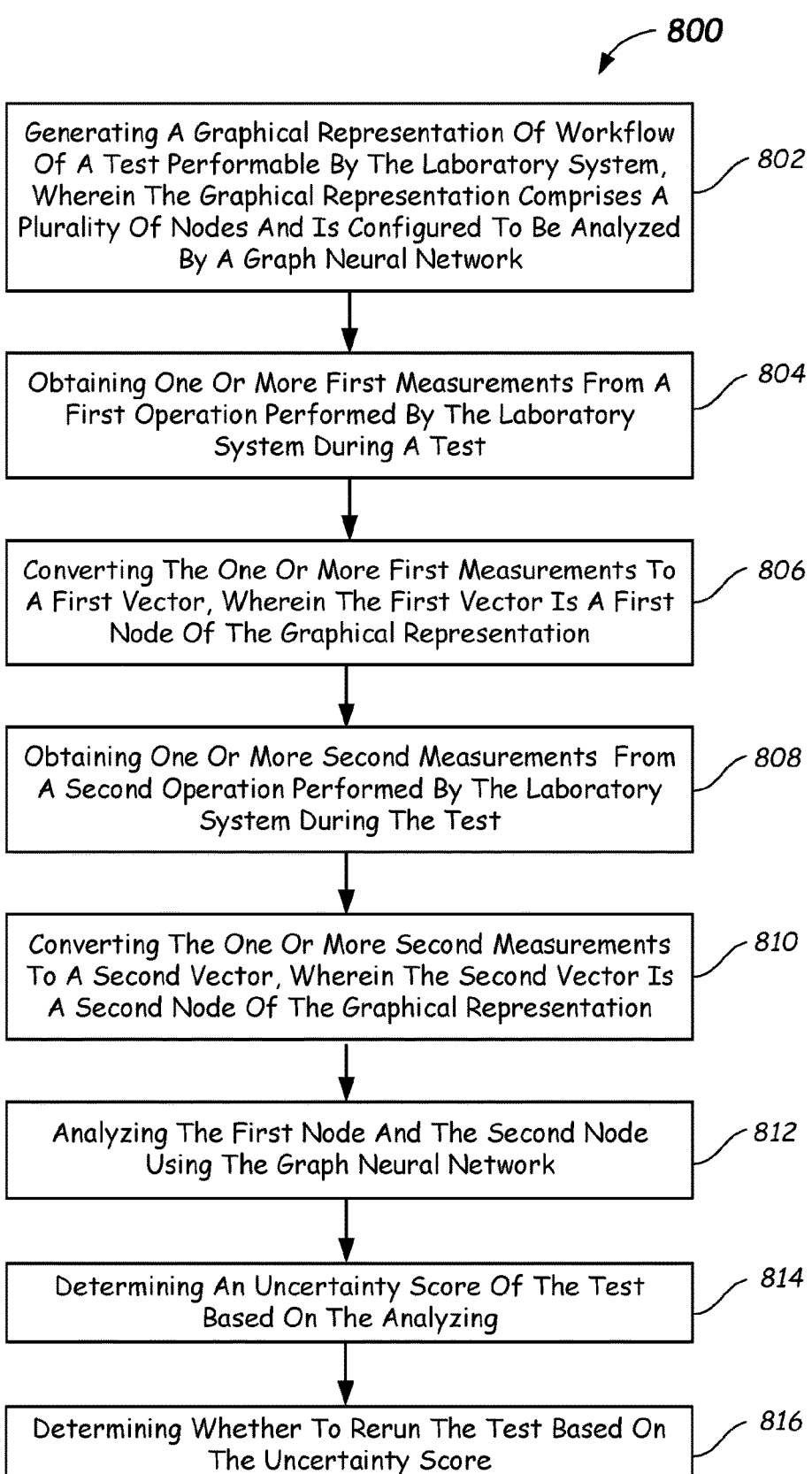

_800_

Generating A Graphical Representation Of Workflow Of A Test Performable By The Laboratory System, Wherein The Graphical Representation Comprises A Plurality Of Nodes And Is Configured To Be Analyzed By A Graph Neural Network _802_

Obtaining One Or More First Measurements From A First Operation Performed By The Laboratory System During A Test _804_

Converting The One Or More First Measurements To A First Vector, Wherein The First Vector Is A First Node Of The Graphical Representation _806_

Obtaining One Or More Second Measurements From A Second Operation Performed By The Laboratory System During The Test _808_

Converting The One Or More Second Measurements To A Second Vector, Wherein The Second Vector Is A Second Node Of The Graphical Representation _810_

Analyzing The First Node And The Second Node Using The Graph Neural Network _812_

Determining An Uncertainty Score Of The Test Based On The Analyzing _814_

Determining Whether To Rerun The Test Based On The Uncertainty Score _816_

FIG. 8

SYSTEMS AND METHODS FOR DETERMINING TEST RESULT ACCURACIES IN DIAGNOSTIC LABORATORY SYSTEMS

CROSS REFERENCE TO RELATED APPLICATION APPLICATIONS

This disclosure is a 371 of PCT/US2023/073611, filed Sep. 7, 2023, which claims the benefit of U.S. Provisional Patent Application No. 63/374,885, entitled "SYSTEMS AND METHODS FOR DETERMINING TEST RESULT ACCURACIES IN DIAGNOSTIC LABORABORY SYSTEMS," filed Sep. 7, 2022, the disclosures of which are hereby incorporated by reference in their entireties for all purposes.

FIELD

Embodiments of the present disclosure relate to determining test result accuracies in diagnostic laboratory systems.

BACKGROUND

Clinical diagnostic laboratory systems process patient samples such as blood serum, blood plasma, urine, interstitial liquid, cerebrospinal liquids, and the like to obtain test results. The test results are subsequently used by clinicians to screen, diagnose, and/or monitor different patient conditions and diseases. Each test includes a plurality of different operations, such as aspirating the samples and adding reagents to the samples. Additionally, different types of tests perform operations in different sequences. If any operation fails during a test and the failure is undetected, the undetected failure can have a significant impact on the test result and any clinical decision made based on the test result. Therefore, a need exists for determining the accuracy of tests performed by diagnostic laboratory systems.

SUMMARY

In some embodiments, a method of determining accuracy of tests performed by a diagnostic laboratory system includes (a) obtaining one or more first measurements during a first operation performed by the diagnostic laboratory system, wherein the first operation is one of a plurality of operations used to perform a first test on a sample; (b) obtaining one or more second measurements during a second operation performed by the diagnostic laboratory system, wherein the second operation is one of the plurality of the operations used to perform the first test; (c) collectively analyzing the one or more first measurements and the one or more second measurements using a trained model with learned correlations between the first operation and the second operation; (d) determining an uncertainty score of the first test based on the collectively analyzing; and (e) determining whether to rerun the first test based on the uncertainty score.

In some embodiments, a method of determining accuracy of tests performed by a diagnostic laboratory system includes (a) generating a graphical representation of a workflow of a test performable by the diagnostic laboratory system, wherein the graphical representation comprises a plurality of nodes and is configured to be analyzed by a graph neural network; (b) obtaining one or more first measurements from a first operation performed by the diagnostic laboratory system during the test; (c) converting the one or more first measurements to a first vector, wherein the first vector is a first node of the graphical representation; (d) obtaining one or more second measurements from a second operation performed by the diagnostic laboratory system during the test; (e) converting the one or more second measurements to a second vector, wherein the second vector is a second node of the graphical representation; (f) analyzing the first node and the second node using the graph neural network; (g) determining an uncertainty score of the test based on the analyzing; and (h) determining whether to rerun the test based on the uncertainty score.

In some embodiments, a diagnostic laboratory system includes one or more modules configured to perform a test, the test having a workflow of a sequence of operations; a plurality of sensors configured to generate one or more measurements for each of the operations; a processor coupled to the sensors; and a memory coupled to the processor. The memory includes a graph neural network and computer program code that, when executed by the processor, causes the processor to (a) generate a graphical representation of the workflow, wherein the graphical representation comprises at least a first node corresponding to a first operation of the workflow and a second node corresponding to a second operation of the workflow; (b) convert one or more first measurements resulting from the first operation to a first vector, wherein the first vector corresponds to the first node; (c) convert one or more second measurements resulting from the second operation to a second vector, wherein the second vector corresponds to the second node; (d) analyze the first vector and the second vector using the graph neural network; (e) determine an uncertainty score of the test based on analyzing the first vector and the second vector; and (f) determine whether to rerun the test based on the uncertainty score.

Still other aspects, features, and advantages of this disclosure may be readily apparent from the following description and illustration of a number of example embodiments, including the best mode contemplated for carrying out the disclosure. This disclosure may also be capable of other and different embodiments, and its several details may be modified in various respects, all without departing from the scope of the disclosure. This disclosure is intended to cover all modifications, equivalents, and alternatives falling within the scope of the claims and their equivalents.

BRIEF DESCRIPTION OF THE DRAWINGS

The drawings, described below, are provided for illustrative purposes, and are not necessarily drawn to scale. Accordingly, the drawings and descriptions are to be regarded as illustrative in nature, and not as restrictive. The drawings are not intended to limit the scope of the disclosure in any way.

3

Figures 2, 4:
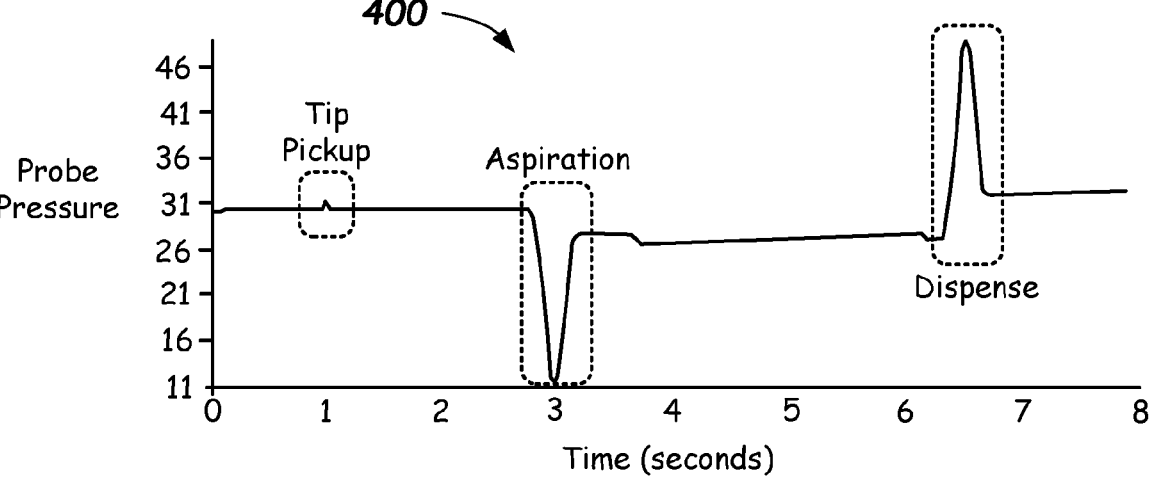
FIG. 2 illustrates a block diagram of an instrument of a diagnostic laboratory system showing modules and operations that may be performed by the instrument according to one or more embodiments.

FIG. 4 is a graph illustrating a pressure trace of a pipette assembly of an aspiration and dispense module located in a diagnostic laboratory system according to one or more embodiments.

FIG. 5A illustrates an example method for determining an uncertainty score for a test of a diagnostic laboratory system and/or for determining whether to retest a sample according to one or more embodiments.

Figure 5B:
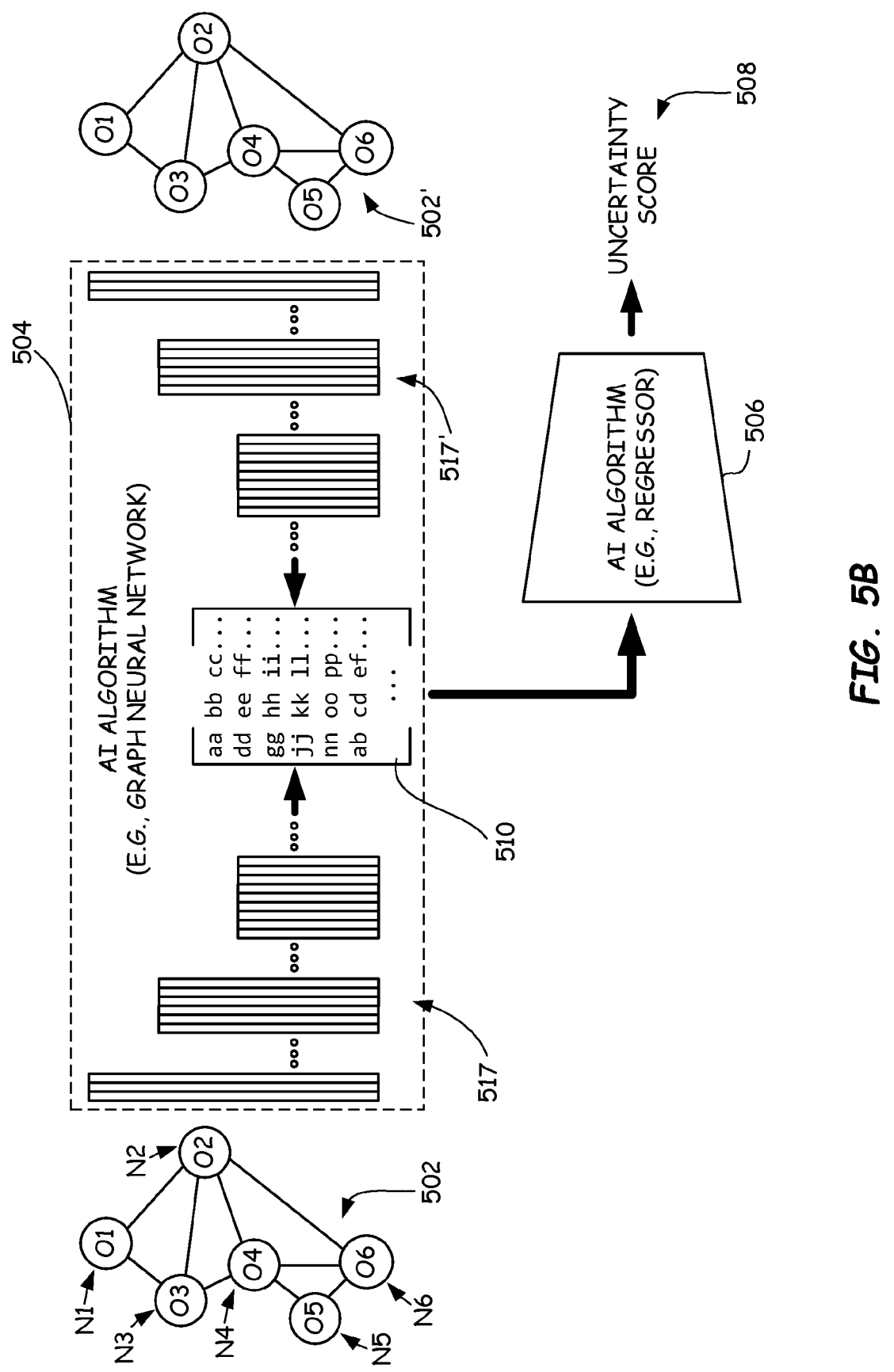

FIG. 5B illustrates an example graph of a test workflow being processed by a graph neural network and an additional AI algorithm to produce an uncertainty score from a compact vector representation of operational data from operations performed during the test workflow, according to embodiments provided herein.

Figure 5C:
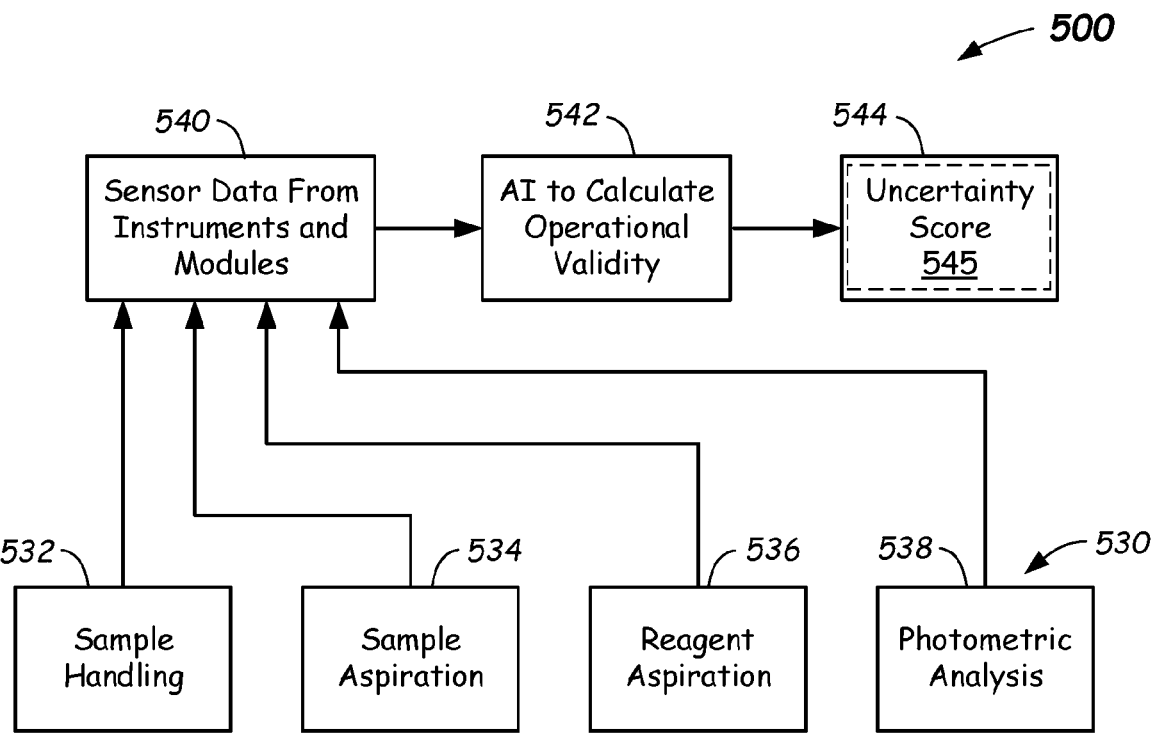

FIG. 5C is a block diagram illustrating the use of algorithms to calculate an uncertainty score resulting from testing of a sample by a diagnostic laboratory system according to one or more embodiments.

Figure 6:
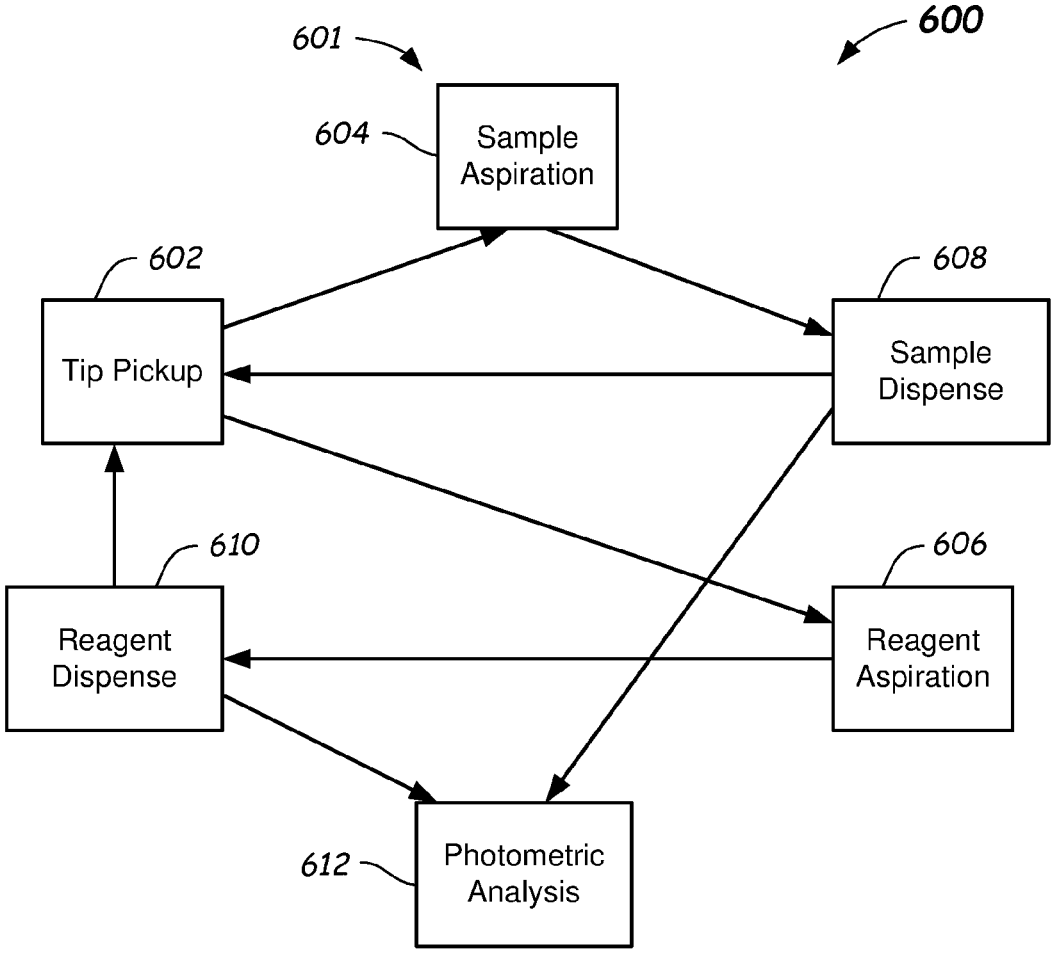

FIG. 6 illustrates a block diagram showing different sequences of operations that may be performed on samples during different tests performed by a diagnostic laboratory system according to one or more embodiments.

FIG. 7 illustrates a flowchart of a method of determining accuracy of tests performed by a laboratory system according to one or more embodiments.

FIG. 8 illustrates a flowchart of another method of determining accuracy of tests performed by a laboratory system according to one or more embodiments.

DETAILED DESCRIPTION

Diagnostic laboratory systems conduct clinical chemistry and/or assays to identify analytes or other constituents in biological samples such as blood serum, blood plasma, urine, interstitial liquid, cerebrospinal liquids, and the like. The samples are collected in sample containers and transported to instruments and modules throughout the laboratory system where the samples are processed and analyzed. For example, the instruments and modules may prepare the samples for tests and conduct those tests on the samples.

When a sample is received in a diagnostic laboratory system for testing, the sample may go through a complex set of sequential operations of a workflow for each type of test. Different ones of the tests may require different sequences of operations. In some tests, the operations may commence with sample container handling where the sample container containing the sample is loaded into the laboratory system, for example. Sample container handling may include other operations such as reading labels on the sample container. Subsequent operations may include sample aspiration, reagent aspiration, and dispensing the sample and/or the reagent into a cuvette. A final operation in the sequence may include performing photometric measurements of a liquid in the cuvette to determine the concentration of a chemical or analyte in the sample. Other operations may be performed on the sample and/or the sample container. The operations may be performed using one or more instruments or modules configured to perform specific operations.

During each operation, a plurality of measurements may be performed. The measurements may include, for example, measurements of instrument performance, the sample, chemicals added to the sample, the sample container, position and/or pressure during an aspiration operation, and the like. A single operation may result in one or more measurements. In some embodiments, the instruments and/or modules of a diagnostic laboratory system may be configured to perform quality checks to validate the operations of the diagnostic laboratory system. These quality checks generate measurements of instrument performance.

The operations performed during testing are performed sequentially. In some instances, multiple minor errors, or measurements just within acceptable validity limits associated with individual operations, may accumulate and ultimately cause inaccurate test results. These inaccurate test results may include underestimated or overestimated analyte concentrations in the samples, which may cause unnecessary treatments to be prescribed to patients.

Unlike conventional laboratory systems, the diagnostic laboratory systems and methods disclosed herein collectively analyze a set of operations taken during laboratory tests and associate an uncertainty score (also referred to as a "biomarker confidence value") with each laboratory test based on a cumulative effect of minor errors or measurements made during each operation within the sets. The uncertainty score or biomarker confidence value indicates whether an overall test result is valid or not. Thus, for clinical decisions, the uncertainty score can be used to determine whether test results can be relied on or whether retesting is required even though individual operational measurements may all be within acceptable limits. The uncertainty score may also indicate whether an instrument is failing. As described below, the uncertainty score or biomarker confidence value is not a simple average or median value based on validity scores of individual operation measurements.

As described previously, a test of a diagnostic laboratory system may include a plurality of sequential operations, and each operation may include a plurality of measurements. In some embodiments provided herein, a vector representation may be created for the measurements of each operation. For example, the vector representation may be an array of measurements which may be obtained by preprocessing raw measurement data (e.g., normalizing the data, mapping the data into a vector space using a dimensionality reduction technique such as principal component analysis (PCA) or independent component analysis (ICA), using an auto-encoder or other AI algorithm, or the like). The vector representation of each operation represents a "fingerprint" of the dynamics of the operation. Thereafter, the overall workflow of the test may be represented as a graph in which each node of the graph corresponds to a specific operation of the test. That is, each node of the graph is the vector representation (fingerprint) of the measurements of a different one of the test's operations.

A graph neural network may be trained to map the above-described workflow graph to a compact vector space representative of all the vector representation fingerprints of the test operations. For example, in some embodiments, a graph auto-encoder may be trained for this purpose. In one or more embodiments, the graph auto-encoder may include a graph encoder which maps all input operational data (e.g., the vector representation of each test operation) to the compact vector space, and a graph decoder, which reconstructs the operational data to its original form (e.g., for training purposes). The graph neural network may be trained on operation workflow data for the test obtained from the day-to-day operation of the diagnostic laboratory system. Such data may be collected from a deployed and fully operational diagnostic laboratory system, for example. Training may be performed continuously, periodically, or at any suitable time. Training may be performed while the diagnostic laboratory system is online (e.g., in use) or offline.

After obtaining the compact vector space representation of the operational data for the test, the compact vector space may be used with a neural network or other AI algorithm to estimate test uncertainty (e.g., via likelihood of test success from the graph-encoded vector representations of each test operation). Additionally, or alternatively, the compact vector space and neural network may be employed to determine an uncertainty score for each operation of the test. In some embodiments, the neural network (or other AI algorithm) used to determine test and/or operational uncertainties based on operational fingerprints (e.g., vector representations) of the test may be trained on data collected for failed operations or tests conducted in a controlled diagnostic laboratory or factory setting. Significantly, in such a controlled setting, a test in which each operation is within an acceptable range (e.g., passes a validity check for that operation) may be flagged as a failed test. For example, if all test operations individually produce valid results but several operations are close to failing, it may be desirable to re-run the test (e.g., if multiple operations are near an upper or lower validity limit for the operations, one operation is near an upper limit while another operation is near a lower limit, etc.). Thus, the neural network may be trained to provide uncertainty scores for tests and provide guidance as to whether a re-test is warranted regardless of whether individual operations within the test have passed or failed internal validity checks. Likewise, by being trained on numerous vector representations for individual operations within a test, the neural network may be trained to identify uncertainty scores for each operation within a test and/or whether to recommend a re-test based on an individual operation's uncertainty score (and/or any combination of individual operation uncertainty scores).

Example measurements may include pressure sensor measurements obtained during aspiration and dispensation of samples and reagents. Other measurements may include, for example, photometric, acoustic, temperature, and optical measurements. In some embodiments, the measurements may include results from quality check algorithms performed by instruments in the laboratory systems. Algorithms used herein may include, for example, deep neural networks, generative neural networks, graph neural networks, and other networks or AI algorithms.

These and other diagnostic laboratory systems and methods that determine accuracy or uncertainty of tests are described in greater detail with reference to FIGS. 1-8.

Figure 1:
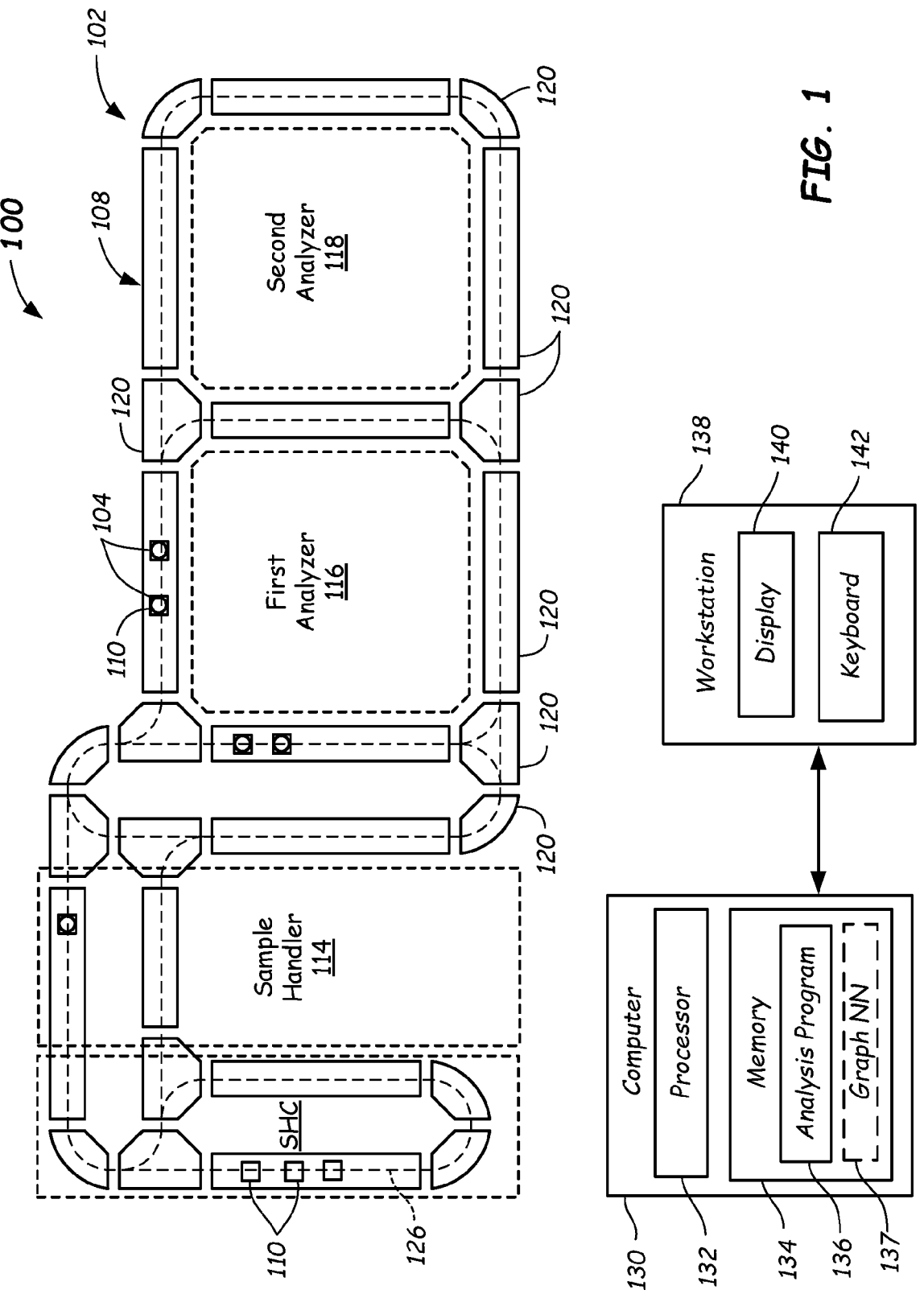
FIG. 1 illustrates a block diagram of a diagnostic laboratory system including a plurality of instruments according to one or more embodiments.

Reference is made to FIG. 1, which illustrates a block diagram of an embodiment of a diagnostic laboratory system 100. The diagnostic laboratory system 100 may include a plurality of instruments 102 configured to process samples and sample containers 104 (a few labelled) and to conduct tests (e.g., assays or other tests) on the samples. Performing the tests may include performing one or more operations on the samples. Each operation may include one or measurements. As described herein, one or more of the instruments 102 may include a plurality of different modules configured to perform the operations described herein. The samples may be various biological specimens collected from individuals, such as patients being evaluated by medical professionals. The samples may be collected in the sample containers 104 and delivered to the laboratory system 100 wherein the sample containers 104 can be transported by a track 108 throughout the laboratory system 100, such as to different ones of the instruments 102. Sample containers 104 may be transported by sample carriers 110 (a few labelled), for example. In the embodiment of FIG. 1, the system 100 has three instruments 102, which include a sample handler 114, a first analyzer 116, and a second analyzer 118. The laboratory system 100 may include fewer or more instruments than shown in FIG. 1.

In some embodiments, the track 108 may extend proximate or around the instruments 102 as shown in FIG. 1. As described herein, portions or modules of the instruments 102 may have devices, such as robots (not shown in FIG. 1), that transfer sample containers 104 to and from the sample carriers 110. The track 108 may include a plurality of segments 120 (a few labelled) that may be interconnected. The sample carriers 110 may move as shown by the dashed lines 126 in the segments 120. In some embodiments, some of the segments 120 may be integral with one or more of the instruments 102.

Diagnostic laboratory systems, such as the laboratory system 100, may have many instruments and may have tracks linked to other laboratory systems. The laboratory systems, including the laboratory system 100, may simultaneously move and process a plurality of sample carriers 110 and their respective sample containers 104. In some embodiments, the laboratory system 100 may move and process hundreds or thousands of sample carriers 110 and their respective sample containers 104 simultaneously.

The laboratory system 100 may include or be coupled to a computer 130 configured to execute one or more programs configured to control the laboratory system 100. The computer 130 may be configured to communicate with the instruments 102 and other components of the laboratory system 100, such as components in a transport system. The transport system may include some or all components configured to transport samples throughout the laboratory system 100 (e.g., motors, sensors, power supplies, etc.). The computer 130 may include a processor 132 configured to execute programs including programs other than those described herein. The programs may be implemented in computer code.

The computer 130 may include or have access to memory 134 that may store one or more programs and/or data. The memory 134 and/or programs stored therein may be referred to as a non-transitory computer-readable medium. The programs may be computer code executable on or by the processor 132. The memory 134 may include an analysis program 136 configured to analyze operations performed by the instruments 102 and/or determine accuracy or uncertainty scores of tests performed by the instruments 102 as described herein. The analysis program 136 may include a plurality of different programs as described herein, including one or more AI algorithms (e.g., graph neural network 137, other generative neural networks, other deep networks or AI algorithms including supervised, semi-supervised or unsupervised AI models, etc.). In some embodiments, the analysis program 136, portions of the analysis program 136, or copies of the analysis program 136 may reside in individual ones the instruments 102 or locations external to the diagnostic laboratory system 100.

The computer 130 may be coupled to a workstation 138 that is configured to enable users to interface with the laboratory system 100. The workstation 138 may include a display 140, a keyboard 142, and other peripherals. The analysis program 136 or other programs may cause the display 140 to display results of data analysis including uncertainty scores (e.g., laboratory biomarker confidence values), test validity scores, and indications as to whether tests should be rerun. Thus, the computer 130 in conjunction with the workstation 138 may be configured to generate a notification of the accuracy of tests, such as uncertainty scores.

The analysis program 136 may perform many functions. In some embodiments, the analysis program 136 may operate in conjunction with other programs to perform the functions. For example, the analysis program 136 may be configured to detect operational failures in the laboratory system 100. If any operation of the laboratory system 100 fails and goes undetected, the undetected failure can have a significant impact on clinical decision making. For example, the tests resulting from the failed operations may be inaccurate, which may cause medical professionals relying on the results to provide inaccurate remedies.

When a sample is received in the laboratory system 100 for testing, the sample undergoes a complex set of sequential operations or processes in a specific workflow that is defined by specific tests. Each type of test may have a unique sequence of operations. The workflow sequence may start with a sample handling or a sample container handling operation followed by operations of sample and/or reagent aspiration and dispensing into a cuvette. The mixture in the cuvette may undergo other operations required by the test. The workflow sequence may conclude with measurement operations, such as photometric measurements, to determine chemical properties of the sample.

Each of the operations in the workflow sequences may be performed using one or more of the instruments 102. Because the operations occur sequentially, minor instrument errors and/or measurements within, but close to, acceptable limits associated with one or more of the operations may accumulate and result in larger errors in the resulting tests. In some embodiments diagnostic laboratory system 100 collectively analyzes the sequential sets of operations performed during tests and determines uncertainty scores of the test results performed within the laboratory system 100. For example, each uncertainty score may be based on end-to-end validity checks of the operations or a set of the operations performed during a test to determine the accuracy of the test. In some embodiments, an uncertainty score may be used to determine if retesting may be required to obtain valid or more accurate test results.

Additional reference is made to FIG. 2, which illustrates a block diagram of an instrument 202 showing modules and/or components associated with the instrument 202, as well as operations associated therewith that may be performed by the instrument 202. (Instrument 202 may be similar to one of the instruments 102 of FIG. 1, for example.) In some embodiments, the modules and/or components of instrument 202 may be within the instrument 202 (e.g., not separate units occupying separate areas). In one or more embodiments, the instrument 202 may include a robot handler 210 that may be configured to grasp and move sample containers 104, sample carriers 110, and/or other containers (vials, cuvettes, and the like) within the instrument 202. The robot handler 210 may operate with an internal transport system 212 that is configured to transport the sample containers 104, the carriers 110, and/or other containers via internal tracks to specific locations within the instrument 202. The internal transport system 212 may be connected to track 108 of laboratory system 100 to receive and return the sample containers 104, the carriers 110, and/or other containers.

In some embodiments, the instrument 202 may include reagent storage 214. The reagent storage 214 may be located in a module within the instrument 202 that is accessible by components of an aspiration and dispense module 216 that are configured to aspirate and dispense the reagents and the samples. A photometric analyzer 218 may perform photometric analysis on the samples with or without one or more reagents added to the samples. A quality check program 220 may perform self-checks and other analyses to determine whether the modules (e.g., modules 210-218) are performing correctly and/or a likelihood that operation results of instrument 202 are accurate. The quality check program 220 may operate with the analysis program 136 (FIG. 1) and/or transmit quality check measurements to the analysis program 136.

Figure 3:
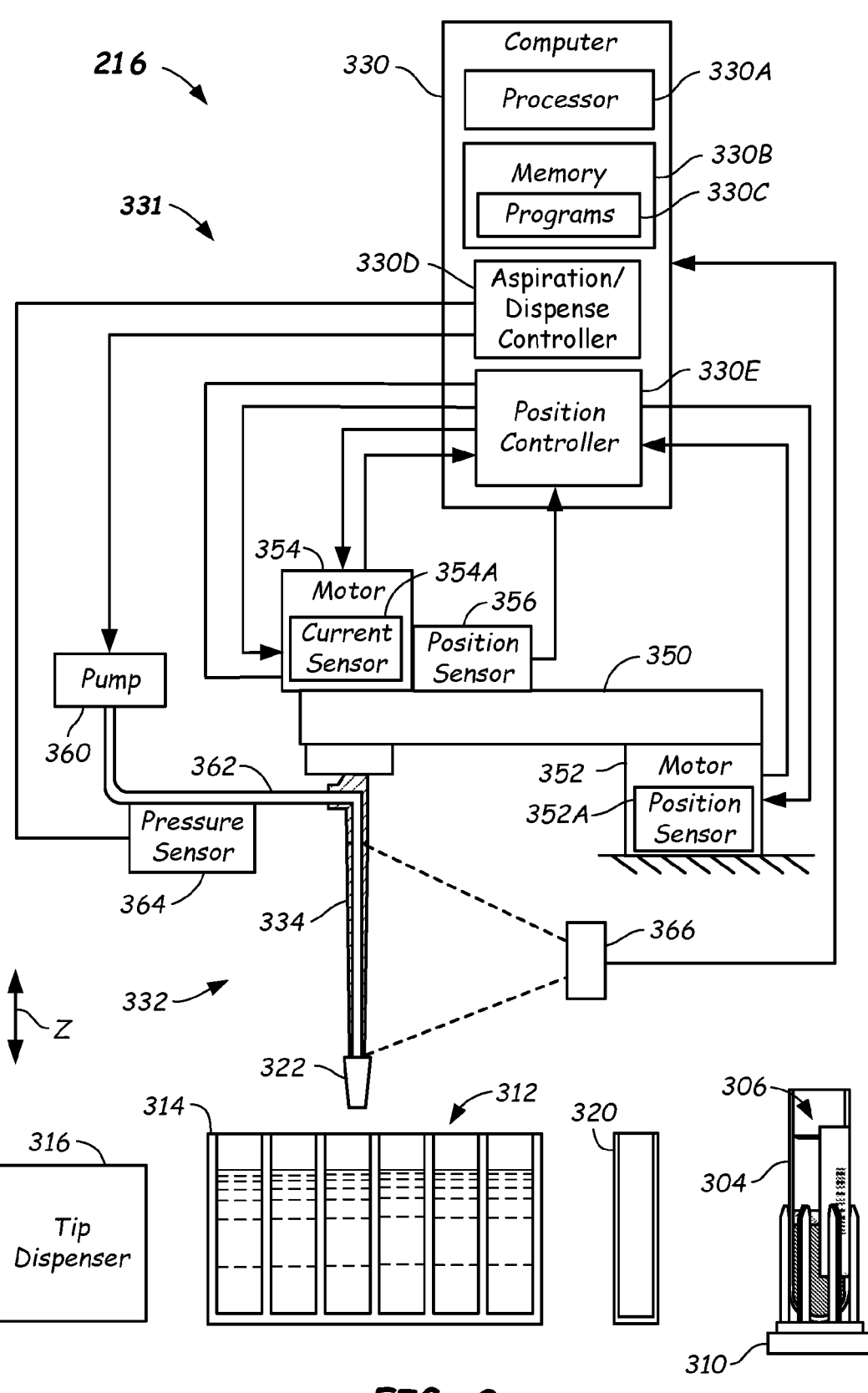
FIG. 3 illustrates a block diagram of an aspiration and dispensing module that may be implemented in an instrument of a diagnostic laboratory system according to one or more embodiments.

Additional reference is made to FIG. 3, which illustrates a block diagram of an embodiment of the aspiration and dispense module 216. The aspiration and dispense module 216 may be implemented in one or more of the instruments 102 (FIG. 1) or the instrument 202 (FIG. 2). Other embodiments of the aspiration and dispense module 216 may be used in the instruments 102 and/or the instrument 202. The embodiment of FIG. 3 illustrates a sample container 304 located in a carrier 310, which is illustrative of the sample containers 104 and the carriers 110 (FIG. 1). The carrier 310 may have been transported to the aspiration and dispense module 216 by the internal transport system 212 (FIG. 2). The sample container 304 may contain a sample 306 that is to be analyzed, processed, and/or tested by the instrument 202 and/or other ones of the instruments 102 (FIG. 1).

The aspiration and dispense module 216 may include reagents 312 stored in a reagent pack 314. As described in greater detail herein, components of the aspiration and dispense module 216 may aspirate the reagents 312 from the reagent pack 314 and the sample 306 from the sample container 304. In some embodiments, the aspiration and dispense module 216 may include a tip dispenser 316 configured to change aspiration probe tips as described herein prior to aspiration operations. The aspiration and dispense module 216 may have a cuvette 320 configured to receive aspirated portions of the reagents 312 and the sample 306 via dispense operations. In some embodiments, the contents of the cuvette 320 may undergo photometric analysis performed by the photometric analyzer 218 (FIG. 2).

The aspiration and dispense module 216 may include a robot 331 that is configured to move a pipette assembly 332 within the aspiration and dispense module 216. In the embodiment of FIG. 3, a probe 334 of the pipette assembly 332 is shown preparing to aspirate a reagent 312 from the reagent pack 314. The probe 334 is shown with a tip 322 attached to an end of the probe 334. The tip 322 may have been placed on the probe 334, such as by the tip dispenser 316 prior to aspirating the reagents 312. A new tip may be placed on the probe 334 by a tip replacement operation, such as by use of the tip dispenser 316 prior to aspirating the reagent 312 or the sample 306.

The sample container 304 is shown in FIG. 3 without a cap, which may have been removed by a decapping module (not shown) in the instrument 202 or by another module (not shown) in the laboratory system 100 that performs a decapping operation. Removal of the cap enables the sample 306 to be aspirated. The pipette assembly 332 may be configured to position the probe 334, by use of the robot 331, to aspirate and dispense the reagents 312 and the sample 306. The reagents 312, other reagents, and a portion of the sample 306 may be dispensed into a reaction vessel, such as the cuvette 320 by moving the probe 334 to an appropriate location and performing a dispense operation. The cuvette 320 may be made of a material that passes light for photometric analysis by the photometric analyzer 218 (FIG. 2) as described herein.

Some components of the aspiration and dispense module 216 may be electrically coupled to a computer 330. In the embodiment of FIG. 3, the computer 330 may include a processor 330A and memory 330B. Programs 330C may be stored in the memory 330B and may be executed by the processor 330A. In other embodiments, the computer 330 and/or components of the computer 330 may be implemented in the computer 130 (FIG. 1). One of the programs 330C may be the quality check program 220 (FIG. 2). The computer 330 may also include an aspiration/dispense controller 330D and a position controller 330E that may be controlled by programs, such as the programs 330C stored in the memory 330B. In some embodiments, the position controller 330E and/or the aspiration/dispense controller 330D may be implemented in separate devices (e.g., other computers). The programs 330C may include algorithms that control and/or monitor components within the aspiration and dispense module 216. In some embodiments, the algorithms may include the position controller 330E and/or the aspiration/dispense controller 330D.

The robot 331 may include one or more arms and motors that are configured to move the pipette assembly 332 within the aspiration and dispense module 216. In the embodiment of FIG. 3, the robot 331 may include an arm 350 coupled between a first motor 352 and the pipette assembly 332. The first motor 352 may be electrically coupled to the computer 330 and may receive instructions generated by the position controller 330E. The instructions may instruct the first motor 352 to move in specific directions and speeds. The first motor 352 may be configured to move the arm 350 to enable the probe 334 to aspirate and/or dispense the sample 306 and/or reagents 312 as described herein. The first motor 352 may include or be associated with a position sensor 352A that is configured to generate measurements (e.g., sensor data) indicating the position of the arm 350. Measurement data generated by the position sensor 352A may be transmitted to the computer 330 and/or the computer 130 (FIG. 1) and may be used by the analysis program 136 as described herein.

A second motor 354 may be coupled between the arm 350 and the pipette assembly 332 and may be configured to move the probe 334 in a vertical direction (e.g., a Z-direction) to aspirate and/or dispense liquids as described herein and to replace the tip 322. The second motor 354 may move the probe 334 in response to instructions generated by the programs 330C. For example, the second motor 354 may enable the probe 334 to enter into and recede from the sample container 304, the cuvette 320, the tip dispenser 316, and/or the reagent pack 314. The second motor 354 may include or be associated with a current sensor 354A that is configured to measure current drawn by the second motor 354. Measurements or sensor data (e.g., measured current) generated by the current sensor 354A may be transmitted to the computer 330 and/or the computer 130 (FIG. 1) and may be used by the analysis program 136 as described herein.

The aspiration and dispense module 216 may include a plurality of position sensors configured to generate measurements related to the positions of components. In the embodiment of FIG. 3, a position sensor 356 may be mechanically coupled to the robot 331. In some embodiments, the position sensor 356 may be coupled to other components in the aspiration and dispense module 216. The position sensor 356 may be configured to sense positions of one or more components of the robot 331 or other components within the aspiration and dispense module 216, such as the pipette assembly 332. In the embodiment of FIG. 3, the position sensor 356 may measure the position of the arm 350, the pipette assembly 332, and/or the probe 334. The measurements (e.g., position data) may be transmitted to the computer 330 and/or the computer 130 for processing by the analysis program 136 as described herein.

The aspiration and dispense module 216 may also include a pump 360 mechanically coupled to a conduit 362 and electrically coupled to the aspiration/dispense controller 330D. The pump 360 may generate a vacuum or negative pressure (e.g., aspiration pressure) in the conduit 362 during aspiration operations. The pump 360 may generate a positive pressure (e.g., dispense pressure) in the conduit 362 during dispense operations.

A pressure sensor 364 may be configured to measure pressure in the conduit 362 and generate measurements (e.g., pressure data) indicative of the pressure. In some embodiments, the pressure sensor 364 may be configured to measure aspiration pressure and generate pressure measurements. In some embodiments, the pressure sensor 364 may be configured to measure dispense pressure and generate pressure measurements. For example, the pressure measurements may be in the form of a pressure trace as a function of time and as described with reference to FIG. 4 below. The pressure measurements ultimately may be transmitted to the computer 130 (FIG. 1) and/or the computer 330 for processing by the analysis program 136. The pressure traces may change as a function of time or when one or more components of the aspiration and dispense module 216 are replaced or failing.

Additional reference is made to FIG. 4, which is a graph illustrating an example of a pressure trace 400 of the pipette assembly 332 measured by the pressure sensor 364 as a function of time. In the embodiment of FIG. 4, the pressure trace 400 shows pressure in the pipette assembly 332 during tip pickup, aspiration, and dispense operations. The pressure rises slightly as the tip 322 is replaced and dips significantly during the aspiration process. The pressure then rises significantly during the dispense operation. The pressure trace 400 represents one or more measurements that may be analyzed by the analysis program 136 as described herein.

Referring again to FIG. 3, the aspiration and dispense module 216 may include an imaging device 366 configured to capture images of the probe 334 and/or liquids in the probe 334. For example, the probe 334 may be transparent so the imaging device 366 can capture images of liquids located in the probe 334. The captured images may comprise image data that is transmitted to and analyzed by the computer 330 and/or the computer 130 (FIG. 1) for processing by the analysis program 136. The image data may include measurements generated during imaging operations, such as during photometric analysis. The programs 330C (or the analysis program 136 of FIG. 1) may analyze the image data to determine the quality of the liquid in the probe 334. For example, the programs 330C or the analysis program 136 may determine whether the liquid in the probe 334 contains bubbles or other anomalies.

As described herein, one or more modules or components, such as aspiration and dispense module 216, of an instrument may include one or more sensors that may be monitored by one or more programs such as programs 330C. Example sensors include position sensors, pressure sensors, imaging sensors, etc. Programs such as programs 330C also may perform quality check (e.g., self-test) routines on the sensors. This information may be provided to computer 130 and/or analysis program 136 (FIG. 1). As described further below, data generated by the self-test routines and sensors include measurements that may be encoded to vector space and/or analyzed by one or more AI algorithms, such as by computer program code in the analysis program 136 (FIG. 1), For example, a first AI algorithm may generate a fingerprint of the dynamics of each operation of a test via a vector representation of operational data (e.g., sensor measurements, self-test measurements, etc.) while a second AI algorithm may analyze the vectors (e.g., the fingerprints) of the various operations of the test to determine the accuracy of the test, such as by calculating or otherwise determining an uncertainty score (e.g., a biometric confidence value).

In greater detail, the analysis program 136 may employ AI algorithms to analyze collective operational data generated by the instruments 102. Based on the analysis, the analysis program 136 may calculate an uncertainty score (e.g., a biomarker confidence value) that is an indication of the validity or accuracy of a test performed on a sample such as sample 306. In some embodiments, the instrument measurements may include, but are not limited to, the pressure sensor measurements obtained during aspiration and dispensation of sample and reagents, such as shown by the pressure trace 400 (FIG. 4). Other measurements may include position data, image data, photometric measurements, acoustic measurements, temperature measurements, optical measurement, quality check or self-check measurements, or the like.

In some embodiments, measurements obtained during each operation of a test are encoded as specific fingerprints (e.g., vectors) representative of the dynamics of the operations. A first AI algorithm trained with learned correlations between operations, such as learned correlations such as between a first operation and a second operation, may then map the fingerprint vector representations to a compact vector space. One or more other AI algorithms are configured to collectively analyze the compact vector space to determine the accuracy of the test, such as by calculating the uncertainty score. In some embodiments, if the uncertainty score is below a predetermined value, the computer 130 (FIG. 1) may generate a notification that the test is not valid and/or that a retest may be required.

FIG. 5A illustrates an example method 500 for determining an uncertainty score for a test of a diagnostic laboratory system and/or for determining whether to retest a sample in accordance with one or more embodiments. FIG. 5B illustrates an example graph 502 of a test workflow being processed by a graph neural network 504 and an additional AI algorithm (e.g., neural network 506) that produces an uncertainty score 508 from a compact vector representation 510 of operational data from operations (e.g., operations O1-O6) performed during the test workflow, in accordance with embodiments provided herein.

With reference to FIG. 5A, in block 512, measurements are obtained for each operation within a test. For example, pressure, temperature, photometric, acoustic, or other parameters, self-test or quality-check measurements, etc., for each operation of a test may be obtained (e.g., provided to computer 130 and/or analysis program 136). Example operations include sample container handling operations, sample aspiration and dispense, reagent aspiration and dispense, photometric measurements to determine chemical concentration and/or assay type, and/or any other test operations.

In block 514, a vector representation may be created for the measurements of each test operation. For example, a vector representation may be an array of measurements which may be obtained by preprocessing raw measurement data (e.g., normalizing the data, mapping the data into a vector space using a dimensionality reduction technique such as principal component analysis (PCA) or independent component analysis (ICA), using an auto-encoder or other AI algorithm, or the like). The vector representation of each operation represents a "fingerprint" of the dynamics of the operation.

Thereafter, in block 516, a graph of workflow for the test may be created. Specifically, the overall workflow of the test may be represented as a graph in which each node of the graph corresponds to a specific operation of the test. That is, each node of the graph is the vector representation (fingerprint) of the measurements of a different one of the test's operations. For example, graph 502 of FIG. 5B illustrates an example test workflow with six operations (labelled O1-O6). Other numbers and/or order of operations may be used. Measurements made during each operation O1-O6 are encoded in a vector representation that corresponds to a node (e.g., nodes N1-N6, respectively) of graph 502 (see also FIG. 6 described below).

In block 518, a graph neural network is used to map the workflow graph into a compact vector space. For example, a graph neural network may be trained to map a test workflow graph to a compact vector space representative of all the vector representation fingerprints of the test operations. In FIG. 5B, graph neural network 504 has been trained to map workflow graph 502 to compact vector space 510. In some embodiments, a graph auto-encoder may be trained for this purpose. In one or more embodiments, the graph auto-encoder may include a graph encoder which maps all input operational data (e.g., the vector representation of each test operation) to the compact vector space, and a graph decoder, which reconstructs the operational data to its original form (e.g., for training purposes). In FIG. 5B, a graph encoder 517 maps graph 502 to compact vector space 510 and graph decoder 517' reconstructs graph 502 (as graph 502'). The graph neural network may be trained on operation workflow data for the test, for example, operation workflow data obtained from the day-to-day operation of the diagnostic laboratory system. Such data may be collected from a deployed and fully operational diagnostic laboratory system, for example. Training may be performed continuously, periodically, or at any suitable time. Training may be performed while the diagnostic laboratory system is online (e.g., in use) or offline.

After obtaining the compact vector space representation of the operational data for the test, in block 520, the compact vector space may be used with a neural network or other AI algorithm to estimate test uncertainty (e.g., compute an uncertainty score for the test, such as likelihood of test success, from the graph-encoded vector representations of each test operation). Additionally, or alternatively, in block 522, the compact vector space and neural network (or other AI algorithm) may be employed to determine an uncertainty score for each operation of the test. For example, in FIG. 5B, neural network 506 may be trained for this purpose. In some embodiments, the neural network (or other AI algorithm) used to determine test and/or operational uncertainties based on operational fingerprints (e.g., vector representations) of the test may be trained on data collected for failed operations or tests conducted in a controlled diagnostic laboratory or factory setting. Significantly, in such a controlled setting, a test in which each operation is within an acceptable range (e.g., passes a validity check for that operation) may be flagged as a failed test. For example, if all test operations individually produce valid results but several operations are close to failing, it may be desirable to re-run the test (e.g., if multiple operations are near an upper or lower validity limit for the operations, one operation is near an upper limit while another operation is near lower limit, etc.). Thus, the neural network may be trained to provide uncertainty scores for tests and provide guidance as to whether a re-test is warranted regardless of whether individual operations within the test have passed or failed internal validity checks. Likewise, by being trained on numerous vector representations for individual operations within a test, the neural network may be trained to identify uncertainty scores for each operation within a test and/or whether to recommend a re-test based on an individual operation's uncertainty score (and/or any combination of individual operation uncertainty scores).

Any suitable neural networks may be employed. Example architectures include Inception, ResNet, ResNeXt, DenseNet, or the like, although other CNN architectures may be employed.

In block 524, based on an uncertainty score for the overall test workflow and/or based on one or more uncertainty scores for individual operations, a determination as to whether to retest may be made and/or provided to a user. In some embodiments, method 500, graph neural network 504, and/or neural network 506 may be implemented in computer 130, memory 134, and/or analysis program 136 (e.g., as computer program code), and analysis program 136 may make retest recommendations and/or execute retesting.

As stated, in some embodiments, neural network 506 (or another AI algorithm) used to determine test and/or operational uncertainties based on fingerprints (e.g., vector representations) of test operations may be trained on data collected for failed operations or tests conducted in a controlled diagnostic laboratory or factory setting. For example, in a controlled diagnostic laboratory, it may be determined that a creatinine concentration test may produce a creatinine concentration value with a variance of +/−0.1 mg/dL under some conditions. Neural network 506 may be trained to provide the estimated creatinine concentration variance, and in some embodiments, recommend a re-test based on the variance. For instance, if a test produces a creatinine concentration value of 0.5 mg/dL+/−0.1 mg/dL, neural network 506 may recommend that for such a low value, the creatinine concentration should be re-tested even though each operation of the creatinine concentration test produced measurements within a valid range (and/or each operation passed its own internal self-check or quality check). Additionally, or alternatively, neural network 506 may be trained to produce an uncertainty score that represents a confidence level, such as 50%, 70%, 90%, or the like, based on operational fingerprints of a test. In some embodiments, a creatinine concentration value of a 0.5 mg/dL with 50% confidence may be flagged for retest even though each operation of the creatinine concentration test produced measurements within a valid range.

In another example embodiment, a test may include obtaining a first measurement during a first operation of the test, wherein the first measurement has a value below, but near, an upper first measurement validity limit. For example, the first measurement may be an aspiration pressure of a reagent that is below, but near an upper validity limit. The test may further include obtaining a second measurement during a second operation of the test, wherein the second measurement has a value above, but near, a lower second measurement validity limit. For example, the second measurement may be an aspiration pressure of a sample that is above, but near a lower validity limit. Detailed analysis in a controlled or factory setting may indicate that, in such cases, a re-test is recommended. The neural network 506 may be trained to provide a low (e.g., failing) uncertainty score in such instances. Specifically, the first and second measurements may be collectively analyzed using a trained model (e.g., neural network 506) with learned correlations between the first operation and the second operation and the neural network 506 may provide a failing uncertainty score for the test based on the collectively analyzing.

A neural network or other AI algorithm (e.g., neural network 506) may be trained to determine if an individual operation has succeeded or failed, and/or, in some embodiments, to provide an uncertainty score for the individual operation. In one embodiment, for example, an uncertainty score for an individual operation may be obtained by training an ensemble of neural networks wherein each network is trained to provide a "likelihood" of whether the operation succeeded. Given a set of likelihoods from the ensemble of networks, a final decision as to whether the operation succeeded or failed may be based on the majority or the mean likelihood score. In addition, the variance of the likelihoods from the ensemble of networks may be used to estimate the uncertainty (and/or uncertainty score) of the individual operation. If the variance is high, this implies the networks in the ensemble do not agree on whether the operation succeeded and hence the uncertainty (and uncertainty score) would be high, and vice versa. As an example, an ensemble of three neural network models may be used to evaluate the same operation. In some embodiments, the neural networks may be different types of networks and/or differently trained neural networks. Assume that network models 1, 2 and 3 output the likelihood of success as 1, 0.8, and 0.1 respectively (with 1 being a high likelihood of success). Using a majority approach, the operational would be reported as having succeeded. However, the uncertainty score of the assessment is high because variance is high (e.g., a standard deviation of 0.47). If the same network ensemble outputs were 1.0, 0.8, and 0.9, then the uncertainty score would be low (e.g., standard deviation of 0.1). In another embodiment, a neural network may output a likelihood of success (or uncertainty score) that is proportional to the confidence of the network. For example, a neural network with a Gaussian process classification layer may be used (see, for example, Amersfoort et al., "On Feature Collapse and Deep Kernel Learning for Single Forward Pass Uncertainty," Arxiv, arXiv.2102.11409, 22 Feb. 2021, https://arxiv.org/abs/2102.11409). In yet another embodiment, an output of a neural network may be explicitly calibrated to be proportional to confidence (e.g., outputting a likelihood of success and/or an uncertainty score for an individual process) such as by using a Platt Calibration or similar algorithm.

Thus, a neural network or other AI algorithm may be trained to provide uncertainty scores for tests and provide guidance as to whether a re-test is warranted regardless of whether individual operations within the test have passed or failed internal validity checks. Likewise, by being trained on numerous vector representations for individual operations within a test, the neural network may be trained to identify uncertainty scores for each operation within a test and/or whether to recommend a re-test based on an individual operation's uncertainty score (and/or any combination of individual operation uncertainty scores).

Additional reference is made to FIG. 1 and FIG. 5C, which is a block diagram 520 illustrating the use of AI algorithms to calculate an uncertainty score 545 according to one or more embodiments. In the embodiment of FIG. 5C, several operations 530 or procedures may be used by the diagnostic laboratory system 100 to test the sample 306 (FIG. 3). Measurements from each of the operations 530 may be encoded as specific fingerprints or vectors representative of the individual operations. In the embodiment of FIG. 5C, the operations 530 include sample handling 532, sample aspiration 534, reagent aspiration 536, and photometric analysis 538. The laboratory system 100 may perform other operations. Each of the operations 530 may be performed in one or more of the instruments 102. Measurements, such as test measurements and measurements generated by self-test programs, may be received in operational block 540.

The measurements generated by the sample handling 532 may be in the form of system logs that record actions performed during the sample handling and any anomalies occurring during the sample handling 532. The measurements generated by the sample handling 532 may be in other forms. For example, the measurements may include pressure applied to grippers to grasp the sample containers 104, weight of the sample containers 104, identification information in the form of image data, and other measurements.

The sample aspiration 534 and reagent aspiration 536 may generate measurements or data as described with regard to the aspiration and dispense module 216 of FIG. 3. The measurements may include pressure traces as illustrated by the pressure trace 400 in FIG. 4 and sensor measurements from the sensors. The measurements may be related to other operations, such as image data indicating whether aspirated liquids contain bubbles. The photometric analysis 538 may generate signal traces or other types of measurements or data commonly generated by photometric analyzers.

The measurements from operational block 540 may be received in operational block 542 where the specific fingerprints representative of the dynamics of the operations 530 are generated. The fingerprints may be encoded into vectors, such as compact vectors. The vector representations may be arrays of measurements obtained by preprocessing raw data generated by one or more of the instruments 102 (FIG. 1) during performance of the operations 601. In some embodiments, preprocessing may involve normalizing the data over a collection of measurements over a feasible or predetermined range of measurements. In other embodiments, preprocessing may involve projection of the raw data to a vector space using dimensionality reduction techniques such as principal component analysis (PCA), independent principal component analysis (ICA), or auto-encoders.

In some embodiments, AI, such as deep networks, generative neural networks, and other trained models may be used to generate the vectors. In some embodiments, each of the vectors may represent an individual operational validity score of the measurements received from operations 530.

The vectors generated by the operational block 542 may be analyzed by one or more AI algorithms in operational block 544 to determine the accuracy of the tests. For example, the one or more AI algorithms in operational block 544 may generate the uncertainty score. In some embodiments, the operational block 544 may use a graph neural network (GNN) plus an additional AI algorithm (e.g., a neural network) to calculate the uncertainty score as described previously with references to FIGS. 5A and 5B. Accordingly, the one or more AI algorithms can learn a combined representation of heterogeneous data or measurements from the modules and/or operations and estimate a confidence score associated with the tests. The methods described herein, such as through the analysis program 136, can be applied to determine the uncertainty score (e.g., accuracy) of the entire set of operations performed during a laboratory test.

The process described in FIG. 5C may be applied to a sample test that includes operations described with reference to FIGS. 3 and 4 to analyze aspiration and dispensing operations in addition to other operations. Because an invalid operation, such as an invalid aspiration operation, increases the likelihood that the subsequent dispensing operation will be invalid and increases the uncertainty of the test, the joint analysis is better equipped to generate an accurate uncertainty score than analyzing each operation individually. Another example relates to the sample and reagent volumes used in the test. For example, the volume of the aspirated sample may be lower than expected but within predetermined limits and the volumes of the aspirated reagents may be greater than expected but within predetermined limits. When analyzed individually, the test would indicate a high likelihood of being valid. However, even though the individual volumes are within their respective predetermined limits, the analyte concentration calculated by the test may not be accurate. Thus, for example, an uncertainty score may be calculated that is less than a predetermined value, which indicates that the associated test should be rerun. In some embodiments, an uncertainty score below a predetermined value may cause computer 130 (executing analysis program 136) to automatically reschedule the associated test.

Other testing procedures and descriptions using graph neural networks (GNNs) will now be described. Referring to the instrument 202 of FIG. 2, the instrument 202 may be configured to perform a plurality of different tests. For example, some tests may be performed using reagents and some tests may be performed without using reagents. Additional reference is made to FIG. 6, which illustrates a block diagram 600 (also referred to as graph 600) showing different sequences of operations 601 that may be performed on samples to conduct different tests or different types of tests according to one or more embodiments. Different instruments may perform different ones of the operations 601 and may perform different sequences of the operations 601 depending on the tests being conducted. The sequences of the operations 601 for individual tests may be referred to as individual workflows. Thus, the block diagram 600 illustrates graphical representations of the workflows.

One or more of the operations 601 may be a node of a graph of a test workflow (e.g., graph 600 or graph 502 of FIG. 5B) and paths between the operations 601 may be edges of the graph. Each of the operations 601 may generate measurements that may be encoded to the vectors or compact vectors (e.g., reduced dimension vectors) as described previously. A GNN may map the vector representation fingerprints to a compact vector space (e.g., compact vector space 510) and another AI algorithm (e.g., neural network 506) may collectively analyze the measurements (via fingerprint vector representations) to determine the accuracy (e.g., uncertainty score) of the test.

The diagram 600 shows the workflows, including operational sequences, for different tests that the instrument 202 may perform. For example, a first operation may be tip pickup 602 wherein the probe 334 (FIG. 3) may replace a tip (e.g., tip 322—FIG. 3) prior to aspirating a sample or a reagent. The tip pickup 602 may include moving the probe 334 to the tip dispenser 316 and replacing the tip 322. After the tip pickup 602, processing may proceed to either sample aspiration 604 or reagent aspiration 606. If a reagent is not to be added to the sample, e.g., processing may proceed directly to sample aspiration 604. The path from the sample aspiration 604 may extend to sample dispense 608 and the path from reagent aspiration 606 may extend to reagent dispense 610. In some embodiments, the sample aspiration 604 and the sample dispense 608 may be a single operation or single node of a graph. In some embodiments, the reagent aspiration 606 and the reagent dispense 610 may be a single operation or single node of a graph. Paths from both the sample dispense 608 and the reagent dispense 610 may extend to the photometric analysis 612. A path from the reagent dispense 610 may extend back to the tip pickup 602 prior to adding new liquids, such as new reagents, to the cuvette 320. Other embodiments of the diagram 600 may include different paths depending on the configuration of the instruments and the tests that the instruments are configured to perform.

Different tests or different types of tests may have different workflows, such as different paths or edges from start to finish. For example, a first test having a first workflow may commence with tip pickup 602 followed by sample aspiration 604. After sample aspiration 604, the test may proceed with sample dispense 608 followed by photometric analysis 612. A second test may have a second workflow and may commence with tip pickup 602, followed by sample aspiration 604. After sample aspiration 604, the test may continue with sample dispense 608 followed by tip pickup 602 to receive a new tip (e.g., tip 322—FIG. 3) on the probe 334 (FIG. 3). The test may proceed to reagent aspiration 606, reagent dispense 610, and may terminate with photometric analysis 612. A third test may have a third workflow and commence with tip pickup 602, followed by sample aspiration 604. After sample aspiration 604, the test may continue to sample dispense 608 followed by tip pickup 602 to receive a new tip on the probe 334. The test may proceed to reagent aspiration 606, then reagent dispense 610, and back to the tip pickup 602. When a new tip is received on the probe 334, the test may proceed to reagent aspiration 606 and reagent dispense 610 to add new reagents to the cuvette 320. This loop may continue to add new reagents to the cuvette 320. The test may then terminate with photometric analysis 612.

Measurements from each of the operations 601 may be encoded into vectors as described with regard to operational block 542 (FIG. 5C). The nodes in the diagram (graph) 600 may then be analyzed by a GNN and then by an additional AI algorithm, such as described with regard to operational block 544 (FIG. 5C). In some embodiments, the AI algorithm may be a neural network. The workflows (e.g., paths or edges) for each of the tests may be analyzed, such as was described with regard to calculating the uncertainty score 545 (FIG. 5C). The AI algorithm may also generate the uncertainty score 545 as described herein.

In more detail, in some embodiments, the analysis program 136 may obtain measurements for individual ones of the operations 601 that collectively perform a test. The analysis program 136 may encode the measurements generated during each of the operations 601 into vector representations. For example, the vector representations may be arrays of measurements obtained by preprocessing raw data generated by one or more of the instruments 102 (FIG. 1) during performance of the operations 601. In some embodiments, preprocessing may involve normalizing the data over a collection of measurements over a feasible or predetermined range of measurements. In other embodiments, preprocessing may involve projection of the raw data to a vector space using dimensionality reduction techniques such as principal component analysis (PCA), independent principal component analysis (ICA), or auto-encoders.

The analysis program 136 may then use GNNs and/or other neural networks to learn operational manifolds of the instruments 102 and/or the laboratory system 100. The operation manifolds may be workflows for different tests as described herein. An autoencoder, such as a variational graph autoencoder (which may include a graph decoder), or other algorithm may be trained to map all the input operational data (e.g., the measurements obtained during testing) to a compact vector space or other vector space. A graph decoder or other decoder may be trained to reconstruct the operational data from the compact vector space or other space (for training purposes). In some embodiments, the model that includes the encoders, decoders, and/or neural networks, may be trained over a large cohort of the operational workflow data and/or measurements obtained from day-to-day operations of the laboratory system 100 (FIG. 1). The edges (paths) of the diagram (graph) 600 may be directed to represent the order or sequence in which the operations are performed for each type of test. The sequences thus model the causal structure of the workflow used to perform the tests. The above-described processes may be implemented in AI algorithms in the analysis program 136 and may enable the projection of operational workflow data to a vector representation.

The model(s) implemented in the analysis program 136 may then be used to detect operational anomalies or recognize operational failures in specific tests. Detection of operational anomalies may be performed by using a compact vector space generated by the trained GNN and constrained to be a Gaussian or a mixture-of-Gaussian distribution. Operational instances that project further away, such as using Mahalanobis distance, may be considered anomalous and may be attributed to operational anomalies. The Mahalanobis distance is a multivariate distance metric that measures the distance between a point and a distribution.

Training of the AI algorithm that generates an uncertainty score from a GNN generated compact vector space may be conducted in controlled laboratories or factory settings where data corresponding to failed operations and/or tests can be obtained. This data can then be combined with a large cohort of data corresponding to successful operations and/or tests to train a neural network to estimate the likelihood of operational success from a graph encoded vector representation used in the GNN. Together with the calculated likelihood score, the neural network may also estimate a validity score associated with each operation that correlates with the operation being the source of a high uncertainty or low uncertainty score. Equipped with such training, the analysis program 136 or other programs may recommend a retest or a user can determine if a retest may be necessary based on the uncertainty score. The status of operations may also be logged in machine logs, such as logs stored in the memory 134 (FIG. 1) and can be used to determine if a specific operation is resulting in consistently low uncertainty scores and whether the corresponding module needs to be revised, serviced, or replaced.

An example of the methods and apparatus disclosed herein may be illustrated by a test performed by at least one of the instruments 102 that includes one reagent added to a sample followed by photometric analysis. Referring to FIG. 6, the workflow for the test has the following sequence: tip pickup 602, sample aspiration 604, sample dispense 608, tip pickup 602, reagent aspiration 606, reagent dispense 610, and photometric analysis 612. Measurements are obtained during each of the operations in the workflow. For example, during tip pickup 602, the measurements may include the pressure measurement (trace) shown in FIG. 4 and position sensor measurements generated by the position sensor 352A and the position sensor 356. These measurements may be encoded into a vector. Measurements generated by other ones of the operations in the workflow may also be encoded into vectors. In some embodiments, the operational block

542 may generate the vectors. A generative adversarial network (GAN), a GNN or other network or model trained on the test workflow may analyze the vectors to generate a compact vector space representation of operational fingerprints of the test that is analyzed by another AI algorithm (e.g., neural network 506) to determine the uncertainty score 545. Based on the uncertainty score 545, the computer 130 may suggest a retest or indicate that the test is valid. For example, the information regarding the uncertainty score 545 may be output to the display 140.

Reference is now made to FIG. 7, which is a flowchart illustrating a method 700 of determining accuracy of tests performed by a laboratory system (e.g., laboratory system 100) according to one or more embodiments. The method 700 includes, at block 702, obtaining one or more first measurements during a first operation performed by the laboratory system, wherein the first operation is one of a plurality of operations used to perform a first test on a sample (e.g., sample 306). The method 700 includes, at block 704, obtaining one or more second measurements during a second operation performed by the laboratory system, wherein the second operation is one of the plurality of the operations used to perform the first test. The method 700 includes, at block 706, collectively analyzing the one or more first measurements and the one or more second measurements using a trained model based on learned correlations between the first operation and the second operation (e.g., graph neural network 504 and/or neural network 506). The method 700 includes, at block 708, calculating an uncertainty score of the first test based on the analyzing. And the method 700 includes, at block 710, determining whether to rerun the first test based on the uncertainty score. For example, analysis program 136 may alert a user to re-run the first test. Method 700 may optionally include rerunning the first test in response to the determination made at block 710, such as when the calculated uncertainty score is less than a predetermined value. In some embodiments, the laboratory system 100 (e.g., computer 130 executing analysis program 136) may automatically initiate the rerunning of the first test.

Reference is now made to FIG. 8, which is a flowchart illustrating a method 800 of determining accuracy of tests performed by a laboratory system (e.g., laboratory system 100) according to one or more embodiments. The method 800 includes, at block 802, generating a graphical representation of a workflow of a test performable by the laboratory system, wherein the graphical representation comprises a plurality of nodes and is configured to be analyzed by a graph neural network (see, for example, test workflow graph 502 of FIG. 5A or test workflow graph 600 of FIG. 6). The method 800 includes, at block 804, obtaining one or more first measurements from a first operation performed by the laboratory system during a test. The method 800 includes, in block 806 converting the one or more first measurements to a first vector, wherein the first vector is a first node of the graphical representation. The method 800 includes, in block 808, obtaining one or more second measurements from a second operation performed by the laboratory system during the test. The method 800 includes, in block 810, converting the one or more second measurements to a second vector, wherein the second vector is a second node of the graphical representation. The method 800 includes, in block 812, collectively analyzing the first node and the second node using the graph neural network. For example, graph neural network 504 may generate a compact vector space representation of the graphical representation (e.g., graph 502 or 600). The method 800 includes, in block 814, determining an uncertainty score of the test based on the analyzing. As described, in some embodiments, the compact vector space may be fed to a trained neural network (e.g., neural network 506) to determine the uncertainty score for the test. The method 800 includes, at block 816, determining whether to rerun the test based on the uncertainty score.

While the disclosure is susceptible to various modifications and alternative forms, specific method and apparatus embodiments have been shown by way of example in the drawings and are described in detail herein. It should be understood, however, that the particular methods and apparatus disclosed herein are not intended to limit the disclosure but, to the contrary, to cover all modifications, equivalents, and alternatives falling within the scope of the claims.

What is claimed is:

1. A method of determining accuracy of tests performed by a diagnostic laboratory system, comprising:
   obtaining one or more first measurements during a first operation performed by the diagnostic laboratory system, wherein the first operation is one of a plurality of operations used to perform a first test on a sample;
   obtaining one or more second measurements during a second operation performed by the diagnostic laboratory system, wherein the second operation is one of the plurality of the operations used to perform the first test;
   collectively analyzing the one or more first measurements and the one or more second measurements using a processor executing a trained model with learned correlations between the first operation and the second operation, wherein training data used to train the trained model is collected from a plurality of failed operations or tests conducted in a controlled diagnostic laboratory or factory setting;
   determining an uncertainty score of the first test based on the collectively analyzing, wherein certain combinations of the one or more first measurements and the one or more second measurements each having acceptable values at or below upper, or at or above lower, measurement validity limits result in high uncertainty scores, the certain combinations based on the learned correlations indicating inaccurate test results caused by those certain combinations; and
   determining whether to rerun the first test based on the uncertainty score.

2. The method of claim 1, further comprising rerunning the first test in response to the uncertainty score being less than a predetermined value.

3. The method of claim 1, wherein:
   the obtaining one or more first measurements during the first operation comprises obtaining a first measurement having a value below an upper first measurement validity limit;
   the obtaining one or more second measurements during the second operation comprises obtaining a second measurement having a value above a lower second measurement validity limit;
   the collectively analyzing comprises collectively analyzing the first measurement and the second measurement using the trained model with learned correlations between the first operation and the second operation; and
   the determining an uncertainty score comprises determining a failing uncertainty score for the first test based on the collectively analyzing.

4. The method of claim 1, further comprising:
   encoding the one or more first measurements to a first vector representation that is representative of the first operation; and encoding the one or more second measurements to a second vector representation that is representative of the second operation.

5. The method of claim 4, wherein:

the encoding the one or more first measurements comprises normalizing the one or more first measurements; and the encoding the one or more second measurements comprises normalizing the one or more second measurements.

6. The method of claim 4, wherein:

the encoding the one or more first measurements comprises generating a reduced dimension vector from the one or more first measurements; and the encoding the one or more second measurements comprises generating a reduced dimension vector from the one or more second measurements.

7. The method of claim 1, wherein:

the collectively analyzing the one or more first measurements and the one or more second measurements using the trained model with learned correlations between the first operation and the second operation comprises using a neural network to encode the one or more first measurements and the one or more second measurements into a vector space; and the determining the uncertainty score comprises determining the uncertainty score based on the vector space.

8. The method of claim 1, further comprising: representing a workflow of at least the first operation and the second operation as a graph having at least a first node and a second node, wherein the first node includes a vector representation of the one or more first measurements and the second node includes a vector representation of the one or more second measurements.

9. The method of claim 8, wherein:

the collectively analyzing the one or more first measurements and the one or more second measurements using the trained model with learned correlations between the first operation and the second operation comprises using a graph neural network to encode the graph into a vector space; and the determining the uncertainty score comprises determining the uncertainty score based on the vector space.

10. The method of claim 9, further comprising training the graph neural network on the workflow.

11. The method of claim 1, wherein the one or more first measurements comprise at least one of pressure, photometric, acoustic, temperature, and optical measurements.

12. The method of claim 1, wherein the first test is performed by a plurality of modules, and further comprising, in response to the uncertainty score being less than a predetermined value, determining which of the plurality of modules caused the uncertainty score to be less than the predetermined value.

13. The method of claim 1, further comprising, in response to the uncertainty score being less than a predetermined value, determining which of the first and second operations caused the uncertainty score to be less than the predetermined value.

14. A method of determining accuracy of tests performed by a diagnostic laboratory system, comprising:

generating a graphical representation of a workflow of a test performable by the diagnostic laboratory system, wherein the graphical representation comprises a plurality of nodes and is configured to be analyzed by a graph neural network;

obtaining one or more first measurements from a first operation performed by the diagnostic laboratory system during the test;

converting the one or more first measurements to a first vector, wherein the first vector is a first node of the graphical representation;

obtaining one or more second measurements from a second operation performed by the diagnostic laboratory system during the test;

converting the one or more second measurements to a second vector, wherein the second vector is a second node of the graphical representation;

analyzing the first node and the second node using the graph neural network, the graph neural network trained on operation workflow data for the test obtained from operation of the diagnostic laboratory system;

determining an uncertainty score of the test based on the analyzing using a second neural network trained on data collected for failed operations or tests conducted in a controlled diagnostic laboratory or factory setting, wherein certain combinations of the one or more first measurements and the one or more second measurements each having acceptable values at or below upper, or at or above lower, measurement validity limits result in high uncertainty scores, the certain combinations based on the data collected used to train the second neural network indicating inaccurate test results caused by those certain combinations; and determining whether to rerun the test based on the uncertainty score.

15. The method of claim 14, wherein:

the diagnostic laboratory system is configured to perform a plurality of operations in a first sequence during the first operation;

the diagnostic laboratory system is configured to perform a plurality of operations in a second sequence during the second operation; and the graph neural network is trained on the first sequence and the second sequence included in the operational workflow data.

16. The method of claim 14, wherein:

the converting the one or more first measurements comprises encoding the one or more first measurements to a first vector representation that is representative of the first operation;

the converting the one or more second measurements comprises encoding the one or more second measurements to a second vector representation that is representative of the second operation, wherein the analyzing comprises collectively analyzing the first vector representation and the second vector representation using the graph neural network to map the first and second vector representations into a vector space; and determining the uncertainty score comprises determining the uncertainty score based on the vector space.

17. The method of claim 16, wherein the encoding comprises employing principal component analysis, independent component analysis or an auto encoder.

18. The method of claim 14, further comprising training the graph neural network on the workflow continuously or periodically while the diagnostic laboratory system is in use.

19. A diagnostic laboratory system, comprising:

one or more modules configured to perform a test, the test having a workflow of a sequence of operations, the one or more modules each comprising hardware components electrically coupled to a computer;

a plurality of sensors configured to generate one or more measurements for each of the operations;

a processor coupled to the sensors, wherein the computer comprises the processor; and a memory coupled to the processor, wherein the computer comprises the memory and the memory includes a graph neural network, a second neural network, and computer program code that, when executed by the processor, causes the processor to:

generate a graphical representation of the workflow, wherein the graphical representation comprises at least a first node corresponding to a first operation of the workflow and a second node corresponding to a second operation of the workflow;

convert one or more first measurements resulting from the first operation to a first vector, wherein the first vector corresponds to the first node;

convert one or more second measurements resulting from the second operation to a second vector, wherein the second vector corresponds to the second node; and analyze the first vector and the second vector using the graph neural network, the graph neural network trained on operation workflow data for the test obtained from operation of the diagnostic laboratory system;

determine an uncertainty score of the test based on analyzing the first vector and the second vector using the second neural network trained on data collected for failed operations or tests conducted in a controlled diagnostic laboratory or factory setting, wherein certain combinations of the one or more first measurements and the one or more second measurements each having acceptable values at or below upper, or at or above lower, measurement validity limits result in high uncertainty scores, the certain combinations based on the data collected used to train the second neural network indicating inaccurate test results caused by those certain combinations; and determine whether to rerun the test based on the uncertainty score.

20. The diagnostic laboratory system of claim 19, wherein the memory includes computer program code that, when executed by the processor, causes the processor to:

encode the one or more first measurements to the first vector that is representative of the first operation;

encode the one or more second measurements to the second vector that is representative of the second operation;

analyze the first vector and the second vector by using the graph neural network to map the first and second vectors into a vector space; and determine the uncertainty score based on the vector space using the second neural network.

* * * * *